(12) United States Patent
Thomas

(10) Patent No.: US 11,148,628 B1
(45) Date of Patent: Oct. 19, 2021

(54) SYSTEM AND METHOD FOR OCCUPANT CLASSIFICATION AND THE REGULATION OF AIRBAG DEPLOYMENT BASED THEREON

(71) Applicant: GM GLOBAL TECHNOLOGY OPERATIONS LLC, Detroit, MI (US)

(72) Inventor: Scott D. Thomas, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/836,053

(22) Filed: Mar. 31, 2020

(51) Int. Cl.
*B60R 21/015* (2006.01)
*B60R 21/01* (2006.01)

(52) U.S. Cl.
CPC .. *B60R 21/01556* (2014.10); *B60R 21/01516* (2014.10); *B60R 21/01532* (2014.10); *B60R 21/01538* (2014.10); *B60R 2021/01272* (2013.01)

(58) Field of Classification Search
CPC ........ B60R 21/01516; B60R 21/01532; B60R 21/01538; B60R 21/01556
See application file for complete search history.

(56) References Cited

U.S. PATENT DOCUMENTS

| | | | | |
|---|---|---|---|---|
| 6,412,813 B1* | 7/2002 | Breed | ...................... | B60J 10/00 280/735 |
| 10,956,759 B1* | 3/2021 | Pertsel | .................. | B60W 40/08 |
| 2003/0105570 A1* | 6/2003 | Basir | ................. | B60R 21/01556 701/45 |
| 2004/0220705 A1* | 11/2004 | Basir | ................. | B60R 21/01538 701/1 |
| 2007/0299586 A1* | 12/2007 | Griffin | .............. | B60R 21/01516 701/45 |
| 2011/0005843 A1* | 1/2011 | Ito | .......................... | B60N 2/002 177/136 |
| 2015/0055678 A1* | 2/2015 | Kawata | ................... | G01S 17/36 374/121 |
| 2019/0184853 A1 | 6/2019 | Thomas et al. | | |
| 2019/0315248 A1 | 10/2019 | Demirovic et al. | | |
| 2021/0001796 A1* | 1/2021 | Kudo | ................ | B60R 21/01556 |

OTHER PUBLICATIONS

U.S. Appl. No. 16/385,777, filed Apr. 16, 2019.
U.S. Appl. No. 16/600,113, filed Oct. 11, 2019.
U.S. Appl. No. 16/662,443, filed Oct. 24, 2019.

* cited by examiner

*Primary Examiner* — James A English
(74) *Attorney, Agent, or Firm* — Harness, Dickey & Pierce, P.L.C.

(57) ABSTRACT

One general aspect includes a system of restraint deployment regulation, the system includes: a memory configured to include a plurality of executable instructions and a processor configured to execute the executable instructions, where the executable instructions enable the processor to: (a) determine, based on a seat occupation sensor output, whether a non-adult occupant is occupying a vehicle seat; (b) determine, based on an in-cabin sensor output, whether a child restraint seat is mounted on the vehicle seat; and (c) based on steps (a) and (b), enable or suppress a deployment of an airbag module that corresponds with the vehicle seat.

20 Claims, 7 Drawing Sheets

SYSTEM AND METHOD FOR OCCUPANT CLASSIFICATION AND THE REGULATION OF AIRBAG DEPLOYMENT BASED THEREON

INTRODUCTION

Pressure based occupant classification systems can come with the drawback of having a large detection "grey zone" that can accidently exclude children in certain circumstances. For example, the size of the grey zone for a seat weight sensor may range from a three (3) year old up to a $5^{th}$ percentile female. It is thus desirable to minimize this grey zone of detection such that airbag suppression would occur during regulated child conditions and airbag deployment would occur for mid-sized children that will be in a seated position to benefit from such a deployment. One way to accomplish this desire is to utilize an in-vehicle sensor such as, for example, a camera to supplement the in-seat occupant sensing system in determining whether or not a booster seat or other child restraint seat is present prior to the occupant sitting on said booster seat (or other child restraint seat). Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of restraint deployment regulation, the method including: (a) determining whether a non-adult occupant is occupying a vehicle seat; (b) determining whether a child restraint seat is mounted on the vehicle seat; and (c) based on steps (a) and (b), enabling or suppressing a deployment of a restraint that corresponds with the vehicle seat. Other embodiments of this aspect include corresponding computer systems, apparatus, and computer programs recorded on one or more computer storage devices, each configured to perform the actions of the methods.

Implementations may include one or more of the following features. The method where: when the non-adult occupant is determined to be sitting in the vehicle seat, (d) determining whether a volume or shape of the non-adult occupant exceeds a threshold value; and step (c) is further based on step (d). The method where: when the non-adult occupant is determined to be sitting on a child restraint seat mounted on the vehicle seat, (d) determining whether a volume or shape of the non-adult occupant exceeds a threshold value; and step (c) is further based on step (d). The method where: when the child restraint seat is determined to be mounted on the vehicle seat, (d) determining whether the child restraint seat includes a seatback; and when the child restraint seat is determined to include the seatback and the non-adult occupant is determined to be occupying the vehicle seat, (e) determining whether a volume or shape of the non-adult occupant exceeds a first threshold value, and where step (c) is further based on step (e); or when the child restraint seat is determined not to include the seatback and the non-adult occupant is determined to be occupying the vehicle seat, (f) determining whether the volume or the shape of the non-adult occupant exceeds a second threshold value, and where step (c) is further based on step (f). The method where step (a) precedes step (b). The method where the restraint is at least one of an airbag module or pretensioner. The method where: when the non-adult occupant is determined to be occupying the vehicle seat, (d) determining whether a volume or shape of the non-adult occupant exceeds a threshold value by at least one of: comparing the volume or shape of the non-adult occupant to the threshold value; or utilizing a probability determination, where the probability of the volume or shape is compared to a predetermined occupant size above the threshold value and a predetermined occupant size below the threshold. Implementations of the described techniques may include hardware, a method or process, or computer software on a computer-accessible medium.

One general aspect includes a system of restraint deployment regulation, the system includes: a memory configured to include a plurality of executable instructions and a processor configured to execute the executable instructions, where the executable instructions enable the processor to: (a) determine, based on a seat occupation sensor output, whether a non-adult occupant is occupying a vehicle seat; (b) determine, based on an in-cabin sensor output, whether a child restraint seat is mounted on the vehicle seat; and (c) based on steps (a) and (b), enable or suppress a deployment of an airbag module that corresponds with the vehicle seat. Other embodiments of this aspect include corresponding computer systems, apparatus, and computer programs recorded on one or more computer storage devices, each configured to perform the actions of the methods.

Implementations may include one or more of the following features. The system where: the executable instructions further enable the processor to: when the non-adult occupant is determined to be sitting in the vehicle seat, (d) determine, based on the in-cabin sensor output, whether a volume or shape of the non-adult occupant exceeds a threshold value; and step (c) is further based on step (d). The system where the executable instructions further enable the processor to: when the child restraint seat is determined to be mounted on the vehicle seat, (d) determine, based on the in-cabin sensor output, whether the child restraint seat includes a seatback; and when the child restraint seat is determined to include the seatback and the non-adult occupant is determined to be occupying the vehicle seat, (e) determine, based on the in-cabin sensor output, whether a volume or shape of the non-adult occupant exceeds a first threshold value, and where step (c) is further based on step (e); or when the child restraint seat is determined not to include the seatback and the non-adult occupant is determined to be occupying the vehicle seat, (f) determine, based on the in-cabin sensor output, whether the volume or the shape of the non-adult occupant exceeds a second threshold value, and where step (c) is further based on step (f). The system where step (a) precedes step (b). The system where occupant size is determined by subtracting a thickness of a child restraint seat from a distance from an occupant landmark to a vehicle seating surface. The system where the seat occupation sensor is installed at the vehicle seat and is configured to detect the occupation of the non-adult occupant in the vehicle seat after the non-adult occupant has placed at least a portion of their body weight on the vehicle seat. The system where the seat occupation sensor is a pressure sensor, capacitive sensor, resistive sensor, weight sensor, or biometric sensor. Implementations of the described techniques may include hardware, a method or process, or computer software on a computer-accessible medium.

One general aspect includes a non-transitory and machine-readable medium having stored thereon executable instructions adapted to regulate restraint deployment, which when provided to a processor and executed thereby, causes the processor to carry out: (a) determine, based on a seat occupation sensor output, whether a non-adult occupant is occupying a vehicle seat; (b) determine, based an in-cabin sensor output, whether a child restraint seat is mounted on the vehicle seat; and (c) based on steps (a) and (b), enable or suppress a deployment of an airbag module that corresponds with the vehicle seat. Other embodiments of this aspect include corresponding computer systems, apparatus, and computer programs recorded on one or more computer storage devices, each configured to perform the actions of the methods.

Implementations may include one or more of the following features. The non-transitory and machine-readable medium where: the processor further carries out: when the non-adult occupant is determined to be sitting in the vehicle seat, (d) determine, based on the in-cabin sensor output, whether a volume or shape of the non-adult occupant exceeds a threshold value; and step (c) is further based on step (d). The non-transitory and machine-readable medium where: when the child restraint seat is determined to be mounted on the vehicle seat, (d) determine, based on the in-cabin sensor output, whether the child restraint seat includes a seatback; and when the child restraint seat is determined to include the seatback and the non-adult occupant is determined to be occupying the vehicle seat, (e) determine, based on the in-cabin sensor output, whether a volume or shape of the non-adult occupant exceeds a first threshold value, and where step (c) is further based on step (e); or when the child restraint seat is determined not to include the seatback and the non-adult occupant is determined to be occupying the vehicle seat, (f) determine, based on the in-cabin sensor output, whether the volume or the shape of the non-adult occupant exceeds a second threshold value, and where step (c) is further based on step (f). The non-transitory and machine-readable medium where step (a) precedes step (b). The non-transitory and machine-readable medium where the in-cabin sensor is a camera, ultrasonic sensor, RADAR sensor, LIDAR sensor, or infrared sensor. The non-transitory and machine-readable medium where the seat occupation sensor is installed at the vehicle seat and is configured to detect the occupation of the non-adult occupant in the vehicle seat after the non-adult occupant has placed at least a portion of their body weight on the vehicle seat. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present embodiment(s). As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
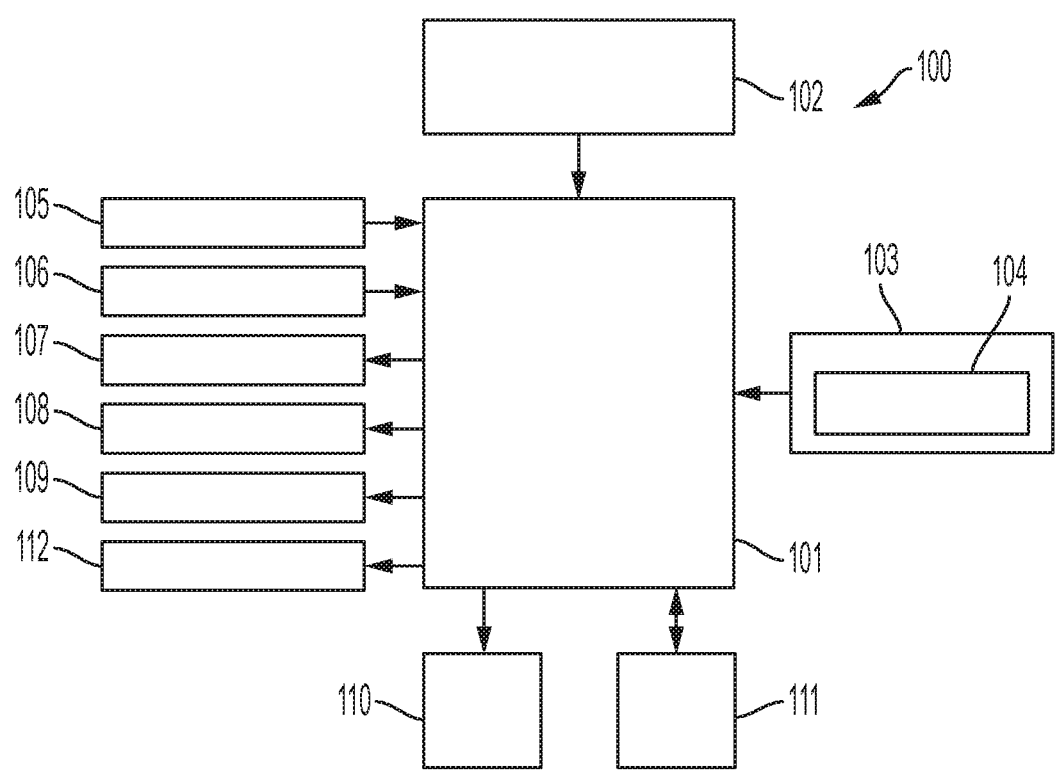
FIG. 1 shows an exemplary block diagram of an exemplary embodiment of a system of airbag deployment regulation.

Referring to the drawings in detail, and specifically to FIG. 1, a block diagram of an exemplary system for occupant classification and the regulation of airbag deployment is generally indicated by reference numeral 100. As shown, the disclosed system 100 includes a controller 101, a power supply 102, a memory 103 incorporating a recognition module 104, one or more in-cabin sensors 105, one or more seat occupation sensors 106, one or more airbag modules 107, and one or more vehicle seats 108. System 100 may further include a display 109, an audio system 110, and a communication device 111. However, system 100 is not limited to the aforementioned configuration and may be configured to include additional elements and/or omit one or more of the aforementioned elements.

Controller 101 can be located in a vehicle telematics unit or other computer module and controller 101 essentially controls the overall operation and function of system 100. Upon reading and executing one or more executable instructions, controller 101 may control, send, and/or receive information from one or more of memory 103, one or more in-cabin sensors 105, one or more seat occupation sensors 106, one or more vehicle seats 108, and communication device 111 of system 100. The controller 101 may include one or more from among a processor, a microprocessor, a central processing unit (CPU), a graphics processor, Application Specific Integrated Circuits (ASICs), Field-Programmable Gate Arrays (FPGAs), state machines, and a combination of hardware, software and firmware components.

Power supply 102 provides power to the controller 101, memory 103, the one or more in-cabin sensors 105, the one or more seat occupation sensors 106, the one or more vehicle seats 108, display 109, audio system 110, and communication device 111. The power supply 102 may include one or more from a battery, an outlet, a capacitor, a solar energy cell, a generator, a wind energy device, an alternator, etc.

Memory 103 can be located in a vehicle telematics unit and is configured for recording information, storing information, and retrieving information used by system 100. Memory 103 may include the executable instructions configured to be read and executed by controller 101 so as to perform the functions of system 100. Memory 103 may also be controlled by controller 101 to record, store, and retrieve various types of data in databases such as, but not limited to, storing and retrieving mapping data in a recognition module 104.

Memory 103 may include one or more from among floppy diskettes, optical disks, CD-ROMs (Compact Disc-Read Only Memories), magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, cache memory, and other type of media/machine-readable medium suitable for storing machine-executable instructions.

Figure 2:
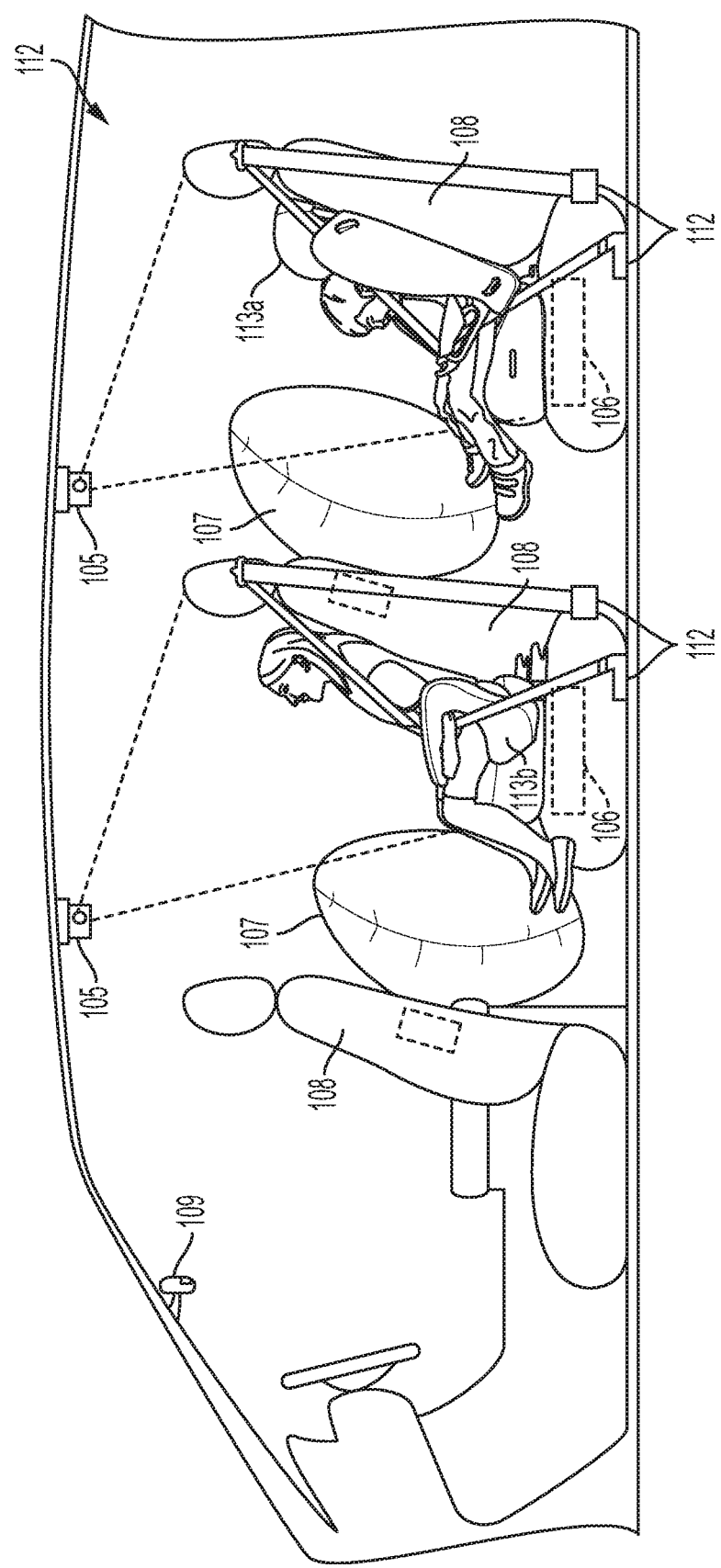
FIG. 2 shows one or more aspects of the exemplary system of airbag deployment regulation being implemented in an exemplary vehicle environment.

The recognition module 104 in memory 103 may act as an object identification software program that can be performed to identify whether a child restraint seat (i.e., a child restraint with a 5 point seat belt harness (not shown), a booster seat with a seat back 113a or a booster seat without a seatback 113b; see FIG. 2) exists in a visual content (e.g., secured on the seat cushion of a vehicle seat) and identify whether a child occupant (i.e., a non-adult occupant) existing in the visual content is larger or smaller than a threshold value. Moreover, the threshold value can be based on at least one of the non-adult occupant's volume or shape (e.g., as based on the non-adult occupant's head height, eye location height, eye glass location height, facial feature height, shoulder height, leg surface height, or a biomechanical model (e.g., a stick figure model). The threshold value can, for a non-limiting example, also be set for a volume or shape of a child between six (6) years of age and ten (10) years of age, for example, a child that is eight (8) years old. In addition, recognition module 104 can implement one or more of the generally known image recognition (processing) techniques such as, but not limited to, cascading classifier techniques, Maximally Stable Extremal Region (MSER) techniques, and emerging machine learning based techniques to support object identification. Image recognition module may also correspond with an image database, having examples of objects (e.g., pictures of CRS and booster seats types and aspects, etc.) and occupant sizes and/or volumes (e.g., based on head height, eye location height, eye glass location height, facial feature height, shoulder height, leg surface height, or a biomechanical model (e.g., a stick figure model), for the purposes of matching one or more visual-content-identified objects. Skilled artisans will see that each of these image recognition (processing) techniques can be used sequentially to identify whether one or more objects exist in the visual content. Moreover, if one or more objects (e.g., a booster seat with or without a seatback or child restraint seat with a 5 point seat belt harness) are identified as existing in the visual content, recognition module 104 may produce an output to acknowledge an object has been identified; otherwise, recognition module 104 may produce an output that recognizes no objects exist in the visual content. This output may also be binary in nature (e.g., a "1" indicates one or more objects have been identified to exist in the visual content and a "0" indicates no objects have been identified to exist in the visual content).

Communication device 111 may be used by system 100 to communicate with various types of external, remote parties (FIG. 2). Communication device 111 may be used to send/receive certain communications such as, but not limited to, executable instructions/executable instruction updates for the recognition module 104 (e.g., software/software updates) and image database. These communications may be sent to remote parties such as, but not limited to, a call center, a computing device, or a mobile computing device. New or developed recognition module data, executable instructions, and image database updates may also be downloaded from the call center, one or more computing devices, or one or more mobile computing devices via communication device 111.

The communication device 111 may include various peripheral communication modules of executable instructions. Such modules may include, but are not limited to, a GPS module, a broadcast receiving module, a near field communication (NFC) module, a wired communication module, and a wireless communication module. The broadcast receiving module may include a terrestrial broadcast receiving module including an antenna to receive a terrestrial broadcast signal, a demodulator, and an equalizer. The NFC module is a module that communicates with an external apparatus located at a nearby distance according to an NFC method. The GPS module is a module that receives a GPS signal from one or more GPS satellites of a satellite constellation and detects a current location. The wired communication module may be a module that receives information over a wired network such as a local area network, a controller area network (CAN), or an external network, via Ethernet cable, fiber optic cable, coaxial cable, etc. The wireless communication module is a module that is connected to an external network by using a wireless communication protocol such as Wi-Fi or IEEE communication protocol and communicates with the external network. The wireless communication module may further include a mobile communication module that accesses a mobile communication network and performs communication according to various mobile communication standards such as 4th generation (4G), 3rd generation partnership project (3GPP), long term evolution (LTE), Bluetooth, Bluetooth Low Energy (BLE), or ZigBee. Skilled artisans will understand that communication device 111 may use one or more of these peripheral modules (or other modules not discussed herein) to send/receive the developed topographical data.

In one or more embodiments, the one or more in-cabin sensors 105 may be a digital camera and may be installed on the ceiling of the vehicle's interior cabin 112, as can be seen with additional reference to FIG. 2. As such, each camera 105 may include the ability to record one or more digital images as bitmapped data representations of tangible objects captured and stored by generally known operations of the camera. As shown, one of the cameras 105 may be positioned to view and record one or more images of the vehicle seats 108 and what they contain for the second-row seats and another camera 105 may be positioned to view and record one or more images of the vehicle seats 108 and what they contain for the third-row vehicle seats. Skilled artisans will see that each camera 105 may be similar to those cameras generally known to be installed on the vehicle's dashboard and trunk door. Cameras may produce two dimensional images or can have two separate imagers to produce a three dimensional image that offers depth perception. Alternatively, in one or more embodiments, the one or more in-cabin sensors 105 may be a generally known ultrasonic sensor, RADAR sensor, LIDAR sensor, or infrared sensor. In addition, various forms of illuminators can be used to enable in-vehicle detection by the in-cabin sensors. It should be understood that the one or more in-cabin sensors 105 may also be installed on the interior cabin portion of a pillar of the vehicle, an instrument panel in the vehicle's interior, on the interior cabin portion of a sidewall of the vehicle, on the interior cabin portion of a vehicle door, the vehicle's rear-view mirror, on the screen of display 109, or on a headrest of one of the one or more vehicle seats 108. It should also be understood that any seating position in a vehicle can be monitored by in-cabin sensors in this manner.

Each seat occupation sensor 106 may be installed in the padding of either the seat cushion or seat back of the one or more vehicle seats 108 or the seat occupation sensor 106 may be installed at a joint between the structure of the one or more vehicle seats 108 and the structure of the vehicle. In one or more embodiments, seat occupation sensor 106 can include a silicone-filled "bladder" and is configured to send an output when changes occur through pressure being applied on top of the bladder. For example, the seat occupation sensor 106 can detect a substantial pressure change in the seat cushion or seatback after a vehicle passenger such as, for example, a child (non-adult occupant) sits down on one of the one or more vehicle seats 108. In one or more embodiments, seat occupation sensor 106 can be a capacitive touch sensor configured to send an output when someone's body physically sits down on the seat cushion or presses against the seat back of the one or more vehicle seats 108 (i.e., an output is sent upon the occupation of the vehicle seat 108). In one or more embodiments, seat occupation sensor 106 can be a resistive sensor that changes resistance when it is deformed or compressed, which is configured to send an output when someone's body physically sits down on the seat cushion or presses up against the seat back of one or more vehicle seats 108. In one or more embodiments, seat occupation sensor 106 can be a biometric sensor (e.g., a temperature and/or light sensor installed in the seatback, fingerprint reader installed on the armrest, etc.) configured to send an output when an occupant is identified upon the occupant sitting down on the seat cushion or pressing against the seat back of the one or more vehicle seats 108 (i.e., an output is sent upon the occupation of the vehicle seat 108). In one or more embodiments, seat occupation sensor 106 can be a weight sensor (e.g., a scale) configured to detect a weight change upon the occupant sitting down on the seat cushion or pressing against the seat back of the one or more vehicle seats 108 (i.e., an output is sent upon the occupation of the vehicle seat 108). Seat occupation sensor 106 can also be configured to provide outputs based on the physical characteristics of the vehicle occupant (e.g., bodyweight, temperature, mass, volume, etc.). For example, seat occupation sensor 106 can provide an output for an adult occupant that is occupying vehicle 114 and the sensor can provide a different output for a non-adult occupant.

After a proper engagement has occurred, the seat occupation sensor 106 may send an unambiguous signal to controller 101 (i.e., an output) indicating something is in the seat or that the seat is empty. This signal may be proportional to the size or mass of whatever is in the seat. This signal may also be binary in nature (e.g., a "1" indicates the seatbelt tongue is inserted into the corresponding seatbelt buckle and a "0" indicates the seatbelt is not being engaged).

Each airbag module 107 is a vehicle occupant-restraint system using a bag designed to both inflate and deflate extremely quickly during a vehicle collision (a substantial impact event). Each airbag module 107 also provides an energy-absorbing surface between the vehicle occupants and the back of one of the vehicle seats 108, the instrument panel, body pillar, headliner, windshield, etc. Each airbag module 107 is operatively connected to one or more inflation devices, which provide gases to forcefully inflate the airbag. Moreover, the inflation device may be partially suppressed to inflate an airbag module 107 at a low deployment force (Stage 1 Deployment) or entirely suppressed to completely restrain airbag deployment. Alternatively, the inflation device may be enabled to inflate the airbag module 107 at a high deployment force (Stage 2 Deployment) or enabled to inflate at a deployment force adequate for a vehicle occupant that is at least a certain size, mass or age, such as for example eight (8) years old. Moreover, when multiple inflation devices are installed in the airbag, activation of each inflation devices may also be timed against the other activations to achieve a specific deployment force that meets the physical requirements of a vehicle occupant (e.g., 1 millisecond, 10 milliseconds, or 100 milliseconds between each activation). In addition, airbag module 107 can be installed throughout the vehicle interior at locations that correspond to a vehicle seat such as, but not limited to, within a steering wheel, instrument panel, side-curtain, seat-mounted side-impact (i.e., within the driver/passenger seat), knee bolster (installed at the bottom of the dashboard), and inflatable seat belt (within the seat belt), backside of vehicle seat 108 (FIG. 2), ceiling, vehicle side wall, vehicle door, or floor.

Each seat belt pretensioner 112 is a vehicle occupant-restraint system component on the seat belt that tightens the belt upon deployment in order to pull out slack. Each pretensioner 112 is operatively connected to an inflation device, which provide gases to forcefully pull slack out of the seat belt webbing. Pretensioners can be located at the seat belt retractor in which the seat belt webbing is stored, at an anchor at the end of the seat belt webbing or on the seat belt buckle. F Pretensioner added to broaden this.

Each vehicle seat 108 includes a seat cushion and a seatback pivotably coupled to the seat cushion as well as positionally defaulted to be substantially perpendicular with respect to the seat cushion. Each vehicle seat 108 can moreover be controlled by controller 101 to be adjusted to an upright arrangement and a folded arrangement. Display 109 may be located in the vehicle and may be preferably a graphics display, such as a touch screen on the vehicle instrument panel, a display on an interior mirror or a heads-up display reflected off of the vehicle's windshield, and can be used to provide a multitude of input and output functions (i.e., capable of GUI implementation). As such, the display 109 may be configured to exhibit information, for example, to present vehicle passengers with one or more notifications corresponding to one or more vehicle systems.

Audio system 110 may provide audio output to one or more vehicle passengers and can be a dedicated, stand-alone system or part of the primary vehicle audio system. According to the one or more embodiments, audio system 110 may provide AM, FM, media streaming services (e.g., PANDORA RADIO™, SPOTIFY™, etc.), satellite radio, CD, DVD, and other multimedia functionality. Audio system 110 may also generate at least one audio notification to announce information being exhibited on display 109 and/or may generate an audio notification which independently announces information. An audio notification may, for example, announce to vehicle passengers one or more notifications corresponding to one or more vehicle systems.

Controller 101 can use the sensor inputs that feed into it to determine if a child restraint seat is present and the general child restraint seat size. If so, then that information can be used by additional interior sensors (not shown—such as seat belt buckle usage sensors, payout sensors, camera sensors, LATCH anchor usage sensors) to determine if the child restraint is properly attached to the vehicle and that the child is properly restrained to the vehicle and child restraint seat.

According to an exemplary aspect, with additional reference to FIG. 2, controller 101 is configured to operate the one or more in-cabin sensors 105 to produce one or more images of at least a portion of one or more vehicle seats 108 and what they contain. For example, upon the start of vehicle operations, or sometime shortly thereafter, controller 101 may operate the one or more in-cabin sensors 105 to produce one or more images of the seat cushion and seat back of at least one vehicle seat 108. Controller 101 is further configured to utilize the recognition module 104 to identify whether at least one object is resting on at least a portion of the one or more vehicle seats 108 (i.e., existing in the visual content). For example, recognition module 104 may implement image recognition techniques to determine if a child restraint seat (i.e., a booster seat with a seat back 113a or without a seatback 113b or a child restraint seat with a five point seat belt harness) has been mounted onto the cushion of one of the one or more vehicle seats 108 (which may be prior to a vehicle occupant entering the vehicle seat 108). The image recognition techniques may also be implemented to determine if a non-adult occupant exists in the one or more images is larger than a threshold value. In addition, controller 101 is configured to operate the one or more seat occupation sensors 106 to detect a non-adult occupant has entered the vehicle seat 108 and is thus sitting on one of the one or more vehicle seats 108. Moreover, controller 101 is configured to enable or suppress airbag deployment and is configured to enable or suppress pretensioner deployment (e.g., via enablement/suppression of the internal inflation device in these safety components) based on some combination of: a determination whether a child restraint seat is mounted onto a vehicle seat (which may further determine whether the child restraint seat includes a seatback) and a determination whether a non-adult occupant that exists in the one or more images (via the output of recognition module 104) is larger than or smaller than a preset threshold value.

According to one or more embodiments, airbag module 107 incorporates a single inflation device and thus the inflation strength of the airbag will occur based on the suppression of the inflation device. For example, the inflation device may be partially suppressed by controller 101 to achieve a specific deployment force that meets the physical requirements of a vehicle occupant (e.g., 40%, 70%, 90% of the maximum inflation strength potential). Moreover, the inflation device may be completely suppressed such that the airbag will not deploy in response to a vehicle impact event. In one or more alternative embodiments, airbag module 107 incorporates two or more inflation devices and thus the inflation strength of the airbag occurs based on the activation timing of these inflation devices. For example, the inflation devices may be timed against each other to achieve a specific deployment force that meets the physical requirements of a vehicle occupant (e.g., 1 millisecond, 10 milliseconds, or 100 milliseconds between activation of each inflation device). Moreover, each inflation device may be completely suppressed such that no inflation devices will be activated and thus the airbag will not deploy in response to a vehicle impact event. According to one or more embodiments, pretensioner 112, which contains an inflation device, may be suppressed by controller 101 such that it is not activated in response to a vehicle impact event.

Figure 3:
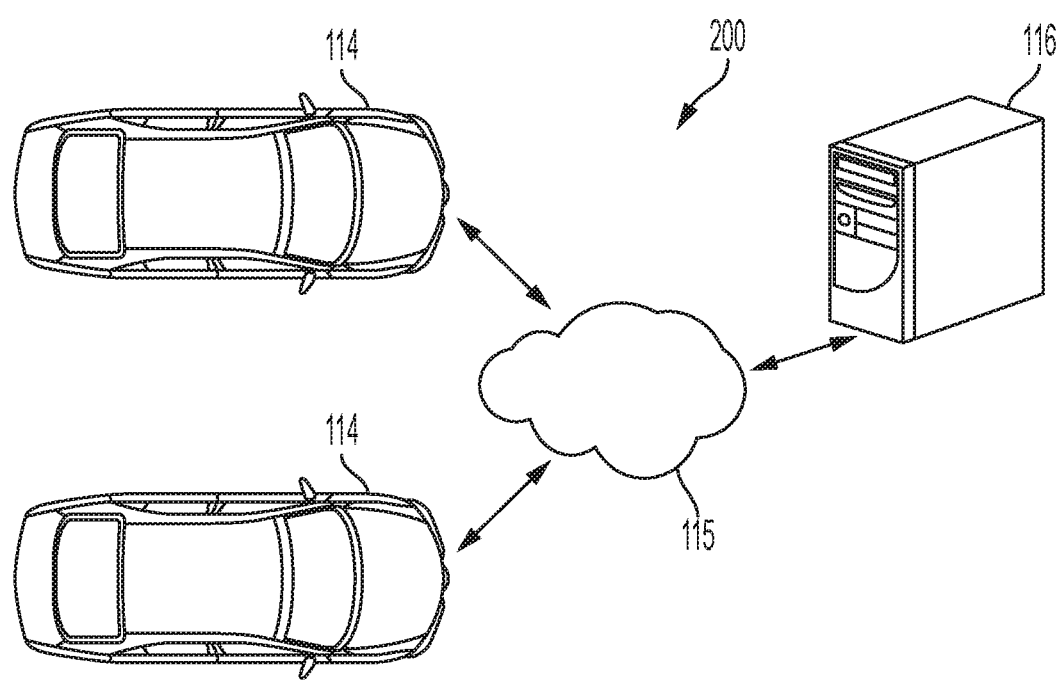
FIG. 3 shows an exemplary diagram of an exemplary system of airbag deployment regulation.

FIG. 3 shows a diagram of system 200 of airbag deployment and possible pretensioner deployment regulation based on occupant classification, according to an exemplary aspect. Referring to FIG. 1, vehicles 114 may also implement their communication device 111 to transmit and receive communications (information) over network 115 to and from a memory 103 (discussed above) generally located within a remote server 116 (i.e., remote party, for example, a call center). The communications that may be transmitted or received or both transmitted and received by one or more vehicles 114 may include, but are not limited to, executable instructions/executable instruction updates for the recognition module 104 and image database. In order to transmit and receive communications over network 115 as well as perform the functions that implement the recognition module 104, vehicles 114 or server 116 or both vehicles 114 and server 116 may include one or more controllers 101 configured to execute instructions for the recognition module 104 as stored in memory 103 of server 116. Alternatively, controller 101 can itself communicate between the modules within the car (as described in FIG. 1) without transmitting the information outside of the vehicle.

Figure 4:
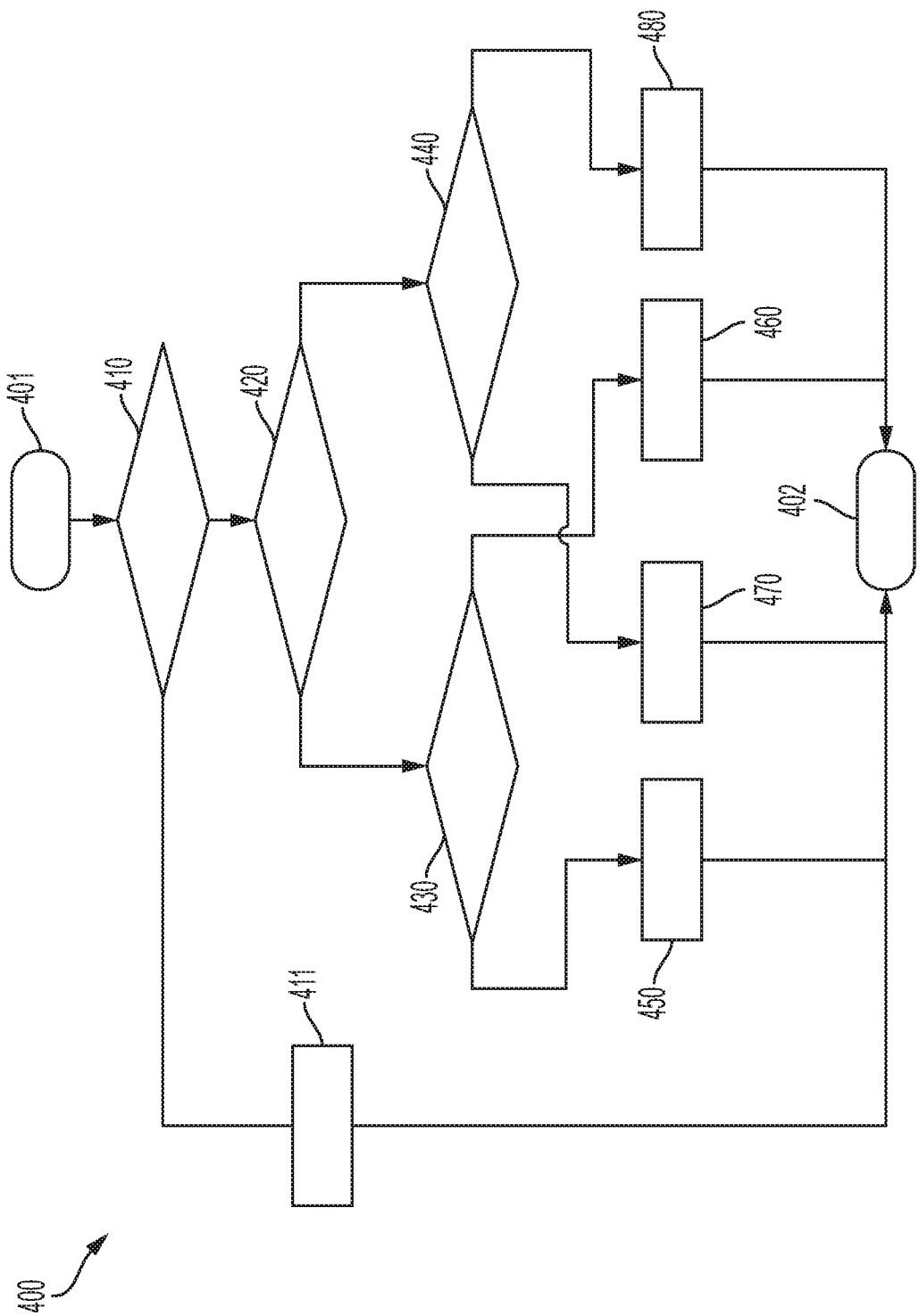
FIG. 4 shows a flow chart generally illustrating an exemplary method that may be performed to regulate airbag deployment.

FIG. 4 shows an exemplary method 400 to regulate airbag module 107 as well as, in certain instances, pretensioner 112 for the purposes of airbag deployment enablement or suppression and possibly pretensioner 112 deployment enablement or suppression based on the characteristics of the occupation of vehicle seat 108, according to an exemplary aspect. Method 400 may begin at 401 in which vehicle 114 is in the OFF state and one or more vehicle doors are unlocked. Method 400 may also begin at 401 when a vehicle door is opened or when vehicle 114 is powered up. Method 400 may continue to be active when the vehicle is either powered or in-gear. Once Method 400 produces an occupant size determination, the method can optionally be hibernated and reawaken if the seat occupation sensor 106 detects a change in state or other vehicle sensors detect a change in occupancy. Moreover, the one or more in-cabin sensors 105 will produce one or more images of at least a portion of one or more vehicle seats 108 and such images will be sent to controller 101 (for at least temporary storage in memory 103). In step 410, seat occupation sensor 106 senses that a vehicle occupant has begun entered onto and has begun to occupy its vehicle seat 108. Moreover, based on the physical characteristics of this occupant, seat occupation sensor 106 will send an output to controller 101. Controller 101 will then use this output to determine whether the occupant should be categorized as an adult, a non-adult occupant (e.g., a child), an empty seat, or an unknown state (such as when the seat is in the process of being occupied or when the in-cabin sensor view is blocked). If a non-adult occupant is detected, method 400 will move to step 420; otherwise, method 400 will move to step 411. As an alternative, if an unknown state is detected, method 400 may move to step 420.

In step 411, controller 101 will enable deployment of selected restraints for the adult state upon occurrence of a substantial impact event. Controller 101 may also suppress deployment of selected restraint(s) for an empty seat and unknown states.

In step 420, controller 101 will analyze the one or more images. As such, controller 101 will implement recognition module 104 to analyze the visual content of the one or more images for the purpose of identifying whether a child restraint seat 113 had been mounted on the vehicle seat 108 (i.e., prior to the non-adult occupant entering onto the vehicle seat). Thus, if a child restraint seat 113 mounted onto vehicle seat 108 has been identified in the visual content, then method 400 will move to step 430; otherwise, method 400 will move to step 440.

In step 430, further implementing recognition module 104, controller 101 will determine whether the volume or shape (or both volume and shape) of the non-adult occupant exceeds the threshold value. In essence, controller 101 will determine if the non-adult occupant that happens to be sitting in the child restraint seat 113 appears to be at least the size of a certain sized person, for example, a child that is eight (8) years old (i.e., a threshold value that takes the child restraint seat 113 into account). If the volume or shape (or both volume and shape) of the non-adult occupant exceeds the threshold value, then method 400 moves to step 450; otherwise, method 400 moves to step 460. This determination may be based on at least one of the non-adult occupant's head height, eye location height, eye glass location height, facial feature height, shoulder height, leg surface height, or a biomechanical model (e.g., stick figure model), for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113a, 113b prior to the occupant sitting in the child restraint seat 113a, 113b or after the occupant sits in the child restraint seat 113a, 113b from the visible portions of the child restraint seat 113a, 113b. This can be done by determining the distance of seating surface of the child restraint seat 113a, 113b from the seating surface(s) of the vehicle seat 108 that can be determined and stored prior to, during, or after the child restraint seat 113a, 113b has been placed in the vehicle seat 108 by viewing the location of the vehicle seat 108 with via one or more in-cabin sensors 105 or by getting inputs from seat position motors. Alternatively, if the one or more in-cabin sensors 105 cannot detect the seating surface location of the child restraint seat 113a, 113b, a nominal offset for a child restraint seat can be substituted. The child restraint seat 113a, 113b surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. Note that the location of the vehicle seat 108 seating surfaces can be determined at earlier steps in this method such as step 410 or step 420. It should be understood that, in certain embodiments, the locations of child restraint seat 113a, 113b seating surfaces can be determined at earlier step 420.

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 430, in those embodiments that implement a probability determination approach, if the occupant's size is deemed from a probability perspective to be nearer the larger occupant's size, the method moves to step 450; otherwise, if the occupant's size is deemed from a probability perspective to be nearer the smaller occupant's size, the method moves to step 460.

In step 450, since the volume and/or shape of the non-adult occupant sitting in the child restraint seat 113 exceeds the threshold (i.e., they are determined to be at least eight (8) years of age), controller 101 will enable deployment of an airbag module 107. For example, controller 101 will allow airbag module 107 to inflate at a high deployment force or at least at a deployment force adequate for a non-adult occupant in a child seat that is at least eight (8) years old and, in certain embodiments, allow the deployment of a pretensioner 112. After step 450, method 400 moves to completion 402.

In step 460, since the volume and/or shape of the non-adult occupant sitting in the child restraint seat 113 is smaller than the threshold (i.e., they are determined to be less than eight (8) years of age), controller 101 will suppress deployment of an airbag module 107. For example, controller 101 will suppress inflation of airbag module 107 to be at a low deployment force (i.e., one suitable for children under the age of eight (8) that are sitting in a child seat) or airbag module 107 will be suppressed to completely restrain airbag module 107 from any type of deployment. In certain embodiments, pretensioner 112 can additionally be suppressed or enabled. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 460, method 400 moves to completion 402.

In step 440, further implementing recognition module 104, controller 101 will determine whether the volume or shape (or both volume and shape) of the non-adult occupant exceeds the threshold value. In essence, controller 101 will determine if the non-adult occupant that happens to be sitting directly on the vehicle seat 108 appears to be the size of a certain sized person, for instance, a child that is eight (8) years old (i.e., a threshold value that only takes the non-adult occupant into account). If the volume or shape (or both volume and shape) of the non-adult occupant exceeds the threshold value, then method 400 moves to step 470; otherwise, method 400 moves to step 480. This determination may be based on at least one of the non-adult occupant's head height, eye location height, eye glass location height, facial feature height, shoulder height, leg surface height, or a biomechanical model (e.g., a stick figure model), for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old. In addition, it is possible to assess against an occupant size greater than the size threshold and against an occupant size smaller than the size threshold and use the probability of the occupant being one of those sizes as the determining factor, where the measured occupant is determined to be on the side of the threshold where the higher probability is determined to be (as discussed above).

In step 470, since the volume and/or shape of the non-adult occupant sitting directly on the vehicle seat 108 exceeds the threshold (i.e., they are determined to be at least eight (8) years of age, or, in the case of the probability comparison based on detected occupant size, have a higher probability of being the larger occupant size), controller 101 will enable deployment of an airbag module 107 and, in certain embodiments, allow the deployment of a pretensioner 112. For example, controller 101 will allow airbag module 107 to inflate at a high deployment force or at least at a deployment force adequate for a non-adult occupant at least eight (8) years old (who is sitting directly on the vehicle seat). After step 470, method 400 moves to completion 402. In step 480, since the volume and/or shape of the non-adult occupant sitting on vehicle seat 108 is smaller than the threshold (i.e., they are determined to be less than eight (8) years of age, or, in the case of the probability comparison based on detected occupant size, have a higher probability of being the larger occupant size), controller 101 will suppress deployment of an airbag module 107. In certain embodiments, the controller can additionally suppress or enable a pretensioner 112. For example, controller 101 will suppress inflation of airbag module 107 to be at a low deployment force (i.e., one suitable for children under the age of eight (8) that are sitting directly on a vehicle seat) or airbag module 107 will be suppressed to completely restrain airbag module 107 from any type of deployment. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state. After step 480, method 400 moves to completion 402.

Figure 5:
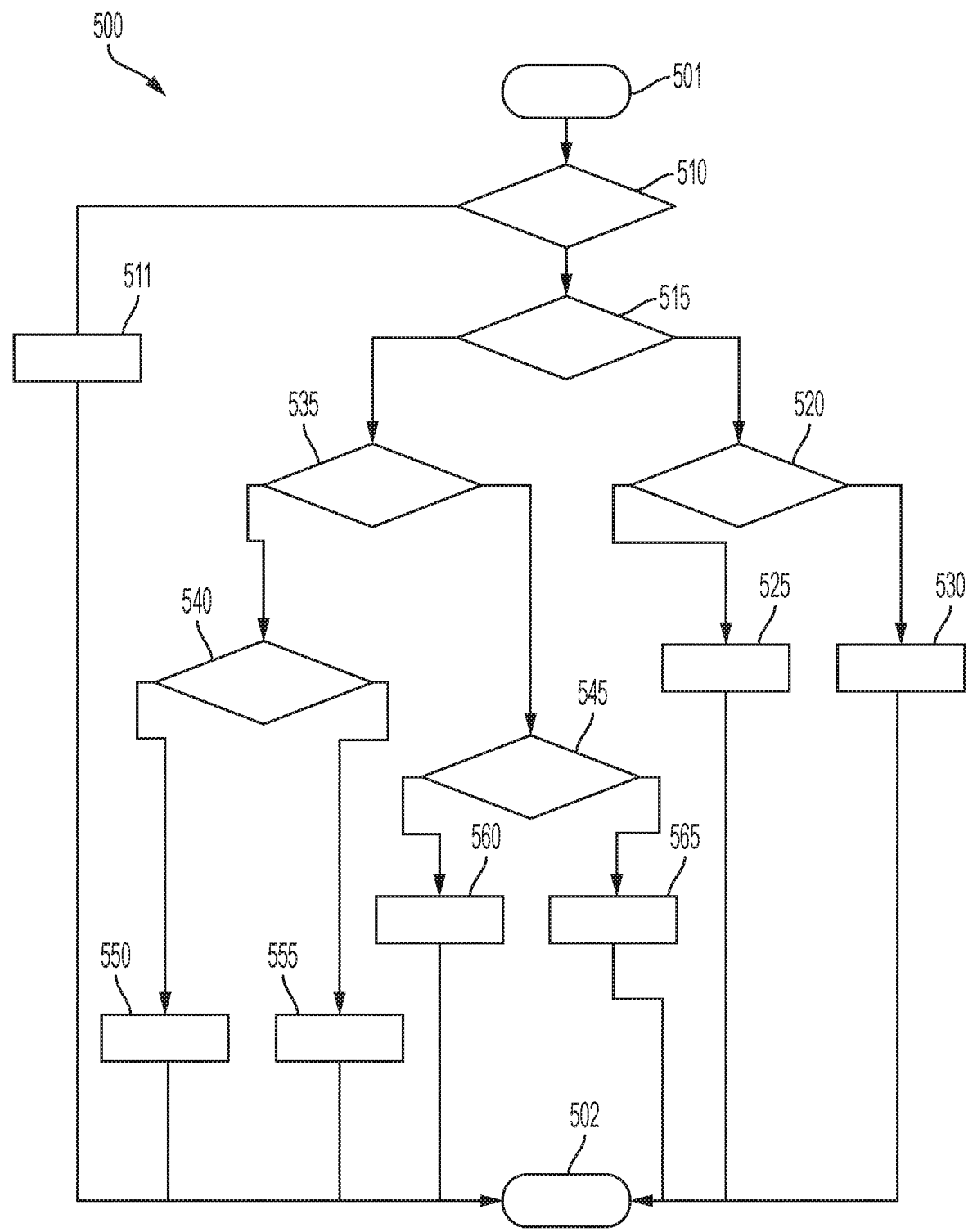
FIG. 5 shows a flow chart generally illustrating another exemplary method that may be performed to regulate airbag deployment.

FIG. 5 shows an exemplary method 500 to regulate airbag module 107 as well as, in certain instances, pretensioner 112 for the purposes of airbag deployment and optionally pretensioner enablement or suppression based on the characteristics of the occupation of vehicle seat 108, according to an exemplary aspect. Method 500 may begin at 501 in which vehicle 114 is in the OFF state and one or more vehicle doors are unlocked. Method 500 may also begin at 501 when a vehicle door is opened or when vehicle 114 is powered up. Method 500 may continue to be active when the vehicle is either powered or in-gear. Once Method 500 produces an occupant size determination, method 500 can be hibernated and reawakened if the seat occupation sensor 106 detects a change in state or other vehicle sensors detect a change in occupancy. Moreover, the one or more in-cabin sensors 105 will produce one or more images of at least a portion of one or more vehicle seats 108 and such images will be sent to controller 101 (for at least temporary storage in memory 103). In step 510, seat occupation sensor 106 senses that a vehicle occupant has entered onto and has begun to occupy its vehicle seat 108. Moreover, based on the physical characteristics of this occupant, seat occupation sensor 106 will send an output to controller 101. Controller 101 will then use this output to determine whether the occupant should be categorized as an adult, a non-adult occupant (e.g., a child), an empty seat, or an unknown state (such as when the seat is in the process of being occupied or when the in-cabin sensor view is blocked). If a non-adult occupant is detected, method 500 will move to step 515; otherwise, method 500 will move to step 511. As an alternative, if an unknown state is detected, method 500 may move to step 515.

In step 511, controller 101 will enable deployment of selected restraints for the adult state, upon occurrence of a substantial impact event. Controller 101 may also suppress deployment of selected restraint(s) for an empty seat and unknown states.

In step 515, controller 101 will analyze the one or more images. As such, controller 101 will implement recognition module 104 to analyze the visual content of the one or more images for the purpose of identifying whether a child restraint seat 113a having a seatback (e.g., a child safety seat, convertible child safety seat, or car seat) had been mounted on the vehicle seat 108 (i.e., prior to the non-adult occupant entering onto the vehicle seat). Thus, if a child restraint seat 113a with seatback has been identified in the visual content, then method 500 will move to step 520; otherwise, method 500 will move to step 535.

In step 520, further implementing recognition module 104, controller 101 will determine whether the volume or shape (or both volume and shape) of the non-adult occupant exceeds the threshold value. In essence, controller 101 will determine if the non-adult occupant that happens to be sitting in the child restraint seat 113 equipped with a seatback appears to be the size of a certain sized person for instance a child that is at least eight (8) years old (i.e., a first threshold value that takes the child restraint seat 113 having a seatback into account). If the volume or shape (or both volume and shape) of the non-adult occupant exceeds the threshold value, then method 500 moves to step 525; otherwise, method 500 moves to step 530. This determination may be based on at least one of the non-adult occupant's head height, eye location height, eye glass location height, facial feature height, shoulder height, leg surface height, or a biomechanical model (e.g., a stick figure model), for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113a is prior to the occupant sitting in the child restraint seat 113a or after the occupant sits in the child restraint seat 113a from the visible portions of the child restraint seat 113a. As discussed above, this can be done by determining the distance of seating surface of the child restraint seat 113a from the seating surface(s) of the vehicle seat 108 that can be determined and stored prior to, during or after the child restraint seat 113a has been placed in the vehicle seat 108 by viewing the location of the vehicle seat 108 with a camera or by getting inputs from seat position motors. Alternatively, if the camera cannot detect the seating surface location of the child restraint seat 113a a nominal offset for a child restraint seat can be substituted. The child restraint seat 113a surfaces can be used to adjust the threshold to reflect this offset distance when looking at the non-adult's position. For instance, the distance between the occupant's eyes and the vehicle seating surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier steps in this method, for example, step 510 or step 515. Likewise, the location of child restraint seat 113a seating surfaces can be determined at earlier step 515.

Since a child restraint seat 113b with a back is present, in Step 520, the distance from the child restraint seat's seat back seating surface from the vehicle seat's seat back surface can also be determined as it would be for the seat bottom surfaces. This can then be used to position the occupant away from the vehicle seat back for the size determination approach (discussed above).

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 520, in those embodiments that implement a probability determination approach, if the occupant's size is deemed from a probability perspective to be nearer the larger occupant' size, the method moves to step 525; otherwise, if the occupant's size is deemed from a probability perspective to be nearer the smaller occupant's size, the method moves to step 530.

In step 525, since the volume and/or shape of the non-adult occupant sitting in the child restraint seat 113 including the seatback exceeds the threshold (i.e., the child is determined to be at least eight (8) years of age), controller 101 will enable deployment of an airbag module 107 and may also allow the deployment of a pretensioner 112. For example, controller 101 will allow airbag module 107 to inflate at a high deployment force or at least at a deployment force adequate for a non-adult occupant in a convertible child safety seat (or some other child seat with seatback) that is at least eight (8) years old. After step 525, method 500 moves to completion 502.

In step 530, since the volume and/or shape of the non-adult occupant sitting in the child restraint seat 113 including the seatback is less than the threshold (i.e., the child is determined to be less than eight (8) years of age), controller 101 will suppress deployment of an airbag module 107. For example, controller 101 will suppress inflation of airbag module 107 to be at a low deployment force (i.e., one suitable for children under the age of eight (8) that are sitting in a child seat having a seatback) or airbag module 107 will be suppressed to completely restrain airbag module 107 from any type of deployment. In certain embodiments, pretensioner 112 can additionally be suppressed or enabled. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 530, method 500 moves to completion 502.

In step 535, controller 101 will analyze the visual content of the one or more images for the purpose of identifying whether a child restraint seat 113 without a seatback (i.e., a backless booster seat) had been mounted on the vehicle seat 108 (i.e., the booster seat was present before the non-adult occupant entered onto the vehicle seat). Thus, if a child restraint seat 113 not comprising a seatback has been identified in the visual content, then method 500 will move to step 540; otherwise, method 500 will move to step 545.

In addition, in this step, further implementing recognition module 104, controller 101 can determine what the volume or shape of the child restraint seat 113a, 113b is prior to the occupant sitting in the child restraint seat 113a, 113b or after the occupant sits in the child restraint seat 113a, 113b from the visible portions of the child restraint seat 113a, 113b. This can be done by determining the distance of seating surface of the child restraint seat 113a, 113b from the seating surface(s) of the vehicle seat 108 that can be determined and stored prior to, during or after the child restraint seat 113a, 113b has been placed in the vehicle seat 108 by viewing the location of the vehicle seat 108 with one or more in-cabin sensors 105 or by getting inputs from seat position motors. Alternatively, if the one or more in-cabin sensors 105 cannot detect the seating surface location of the child restraint seat 113a, 113b, a nominal offset for a child restraint seat can be substituted. The child restraint seat 113a, 113b surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier steps in this method, for example, step 510 or step 515. Likewise, the location of the child restraint seat 113a, 113b seating surfaces can be determined at step 515.

In step 540, further implementing recognition module 104, controller 101 will determine whether the volume or shape (or both volume and shape) of the non-adult occupant exceeds the threshold value. In essence, controller 101 will determine if the non-adult occupant that happens to be sitting in the child restraint seat 113 without a seatback (i.e., booster seat) appears to be the size of a certain sized person for instance a child that is at least eight (8) years old (i.e., a second threshold value that takes the child restraint seat 113 having no seatback into account). If the volume or shape (or both volume and shape) of the non-adult occupant exceeds the threshold value, then method 500 moves to step 550; otherwise, method 500 moves to step 555. This determination may be based on at least one of the non-adult occupant's head height, eye location height, eye glass location height, facial feature height, shoulder height, or leg surface height, or a biomechanical model (e.g., a stick figure model), for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113*b* is prior to the occupant sitting in the child restraint seat 113*b* or after the occupant sits in the child restraint seat 113*b* from the visible portions of the child restraint seat 113*b*. This can be done by determining the distance of seating surface of the child restraint seat 113*b* from the seating surface(s) of the vehicle seat 108 that can be determined and stored prior to, during or after the child restraint seat 113*b* has been placed in the vehicle seat 108 by viewing the location of the vehicle seat 108 with one or more in-cabin sensors 105 or by getting inputs from seat position motors. Alternatively, if the one or more in-cabin sensors 105 cannot detect the seating surface location of the child restraint seat 113*b*, a nominal offset for a child restraint seat can be substituted. The child restraint seat 113*b* surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier steps in this method, for example, step 510, step 515, or step 535. Likewise, the location of the child restraint seat 113*b* seating surfaces can be determined at step 515 or step 535.

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 540, in those embodiments that implement a probability determination approach, if the occupant's size is deemed from a probability perspective to be nearer the larger occupant' size, the method moves to step 550, otherwise, if the occupant's size is deemed from a probability perspective to be nearer the smaller occupant's size, the method moves to step 555.

In step 550, since the volume and/or shape of the non-adult occupant sitting in the child restraint seat 113 without a seatback exceeds the threshold (i.e., the child is determined to be at least eight (8) years of age), controller 101 will enable deployment of an airbag module 107 and may also allow the deployment of a pretensioner 112. For example, controller 101 will allow airbag module 107 to inflate at a high deployment force or at least at a deployment force adequate for a non-adult occupant in a booster seat that is at least eight (8) years old. After step 550, method 500 moves to completion 502.

In step 555, since the volume and/or shape of the non-adult occupant sitting in the child restraint seat 113 without seatback is smaller than the threshold (i.e., they are determined to be less than eight (8) years of age), controller 101 will suppress deployment of an airbag module 107. For example, controller 101 will suppress inflation of airbag module 107 to be at a low deployment force (i.e., one suitable for children under the age of eight (8) that are sitting in a booster seat) or airbag module 107 will be suppressed to completely restrain airbag module 107 from any type of deployment. In certain embodiments, pretensioner 112 can additionally be suppressed or enabled. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 555, method 500 moves to completion 502.

In step 545, no child restraint seat 113 (either with or without a seatback) has been identified in the visual content. Moreover, controller 101 will determine if the non-adult occupant that happens to be sitting directly on the vehicle seat 108 exceeds a threshold value. In essence, controller 101 will determine if the child sitting on vehicle seat 108 appears to be the size of a certain sized person, for instance, a child that is at least eight (8) years old (i.e., a third threshold value that only takes the non-adult occupant into account). If the volume or shape (or both volume and shape) of the non-adult occupant exceeds this third threshold value, then method 500 moves to step 560; otherwise, method 500 moves to step 565. This determination may be based on at least one of the non-adult occupant's head height, eye location height, eye glass location height, facial feature height, shoulder height, leg surface height, or a biomechanical model (e.g., a stick figure model), for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old. In addition, it is possible to assess against an occupant size greater than the size threshold and against an occupant size smaller than the size threshold and use the probability of the occupant being one of those sizes as the determining factor, where the measured occupant is determined to be on the side of the threshold where the higher probability is determined to be (as discussed above).

In step 560, since the volume and/or shape of the non-adult occupant sitting directly on the vehicle seat 108 exceeds the threshold (i.e., they are determined to be at least eight (8) years of age), controller 101 will enable deployment of an airbag module 107 and optionally allow the deployment of a pretensioner 112. For example, controller 101 will allow airbag module 107 to inflate at a high deployment force or at least at a deployment force adequate for a non-adult occupant at least eight (8) years old (who is sitting directly on the vehicle seat). After step 560, method 500 moves to completion 502.

In step 565, since the volume and/or shape of the non-adult occupant sitting on vehicle seat 108 is less than the threshold (i.e., they are determined to be less than eight (8) years of age), controller 101 will suppress deployment of an airbag module 107. For example, controller 101 will suppress inflation of airbag module 107 to be at a low deployment force (i.e., one suitable for children under the age of eight (8) that are sitting directly on a vehicle seat) or airbag module 107 will be suppressed to completely restrain airbag module 107 from any type of deployment. In certain embodiments, pretensioner 112 can additionally be suppressed or enabled. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 565, method 500 moves to completion 502.

Figure 6:
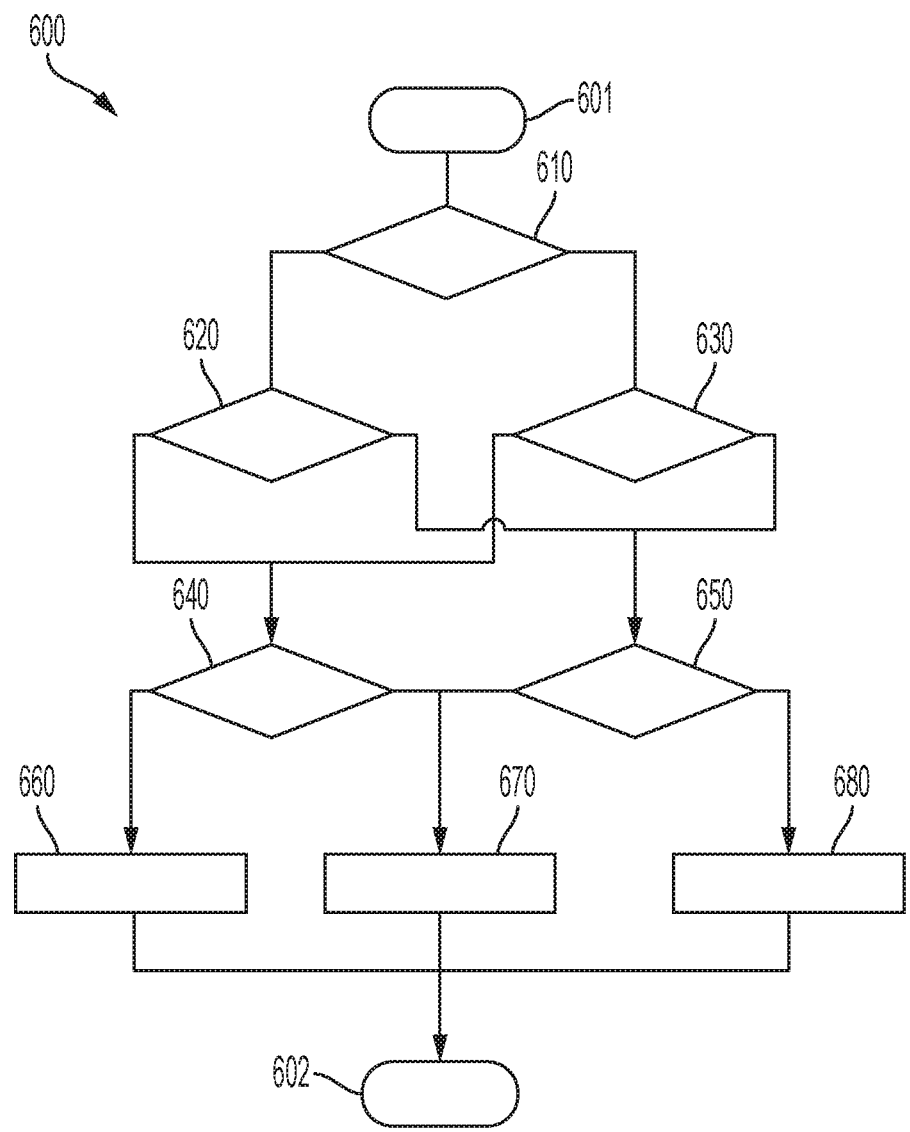
FIG. 6 shows a flow chart generally illustrating another exemplary method that may be performed to regulate airbag deployment.

FIG. 6 shows an exemplary method 600 to regulate airbag module 107 and, in certain instances, pretensioner 112 for the purposes of airbag deployment and optionally pretensioner enablement or suppression based on the characteristics of the occupation of vehicle seat 108, according to an exemplary aspect. Method 600 may begin at 601 in which vehicle 114 is in the OFF state and one or more vehicle doors are unlocked. Method 600 may also begin at 601 when a vehicle door is opened or when vehicle 114 is powered up. Method 600 may continue to be active when the vehicle is either powered or in-gear. Once Method 600 produces an occupant size determination, method 600 can optionally be hibernated and reawaken if the seat occupation sensor 106 detects a change in state or other vehicle sensors detect a change in occupancy. Moreover, the one or more in-cabin sensors 105 will produce one or more images of at least a portion of one or more vehicle seats 108 and such images will be sent to controller 101 (for at least temporary storage in memory 103).

In step 610, controller 101 will analyze the one or more images by implementing recognition module 104 to analyze the visual content of the one or more images for the purpose of identifying whether a child restraint seat 113*a*, 113*b* had been mounted on the vehicle seat 108 (i.e., prior to the non-adult occupant entering onto the vehicle seat). Thus, if a child restraint seat 113*a*, 113*b* mounted onto vehicle seat 108 has been identified in the visual content, then method 600 will move to step 620; otherwise, method 600 will move to step 630.

In step 620, further implementing recognition module 104, controller 101 will determine whether the volume or shape (or both volume and shape) of an occupant that has entered onto and begun to occupy the child restraint seat exceeds the threshold value. In essence, controller 101 will determine if the occupant that happens to be sitting in the child restraint seat 113*a*, 113*b* appears to be the size of a certain sized person, for instance, a child that is at least eight (8) years old (i.e., a threshold value that takes the child restraint seat 113*a*, 113*b* into account). If the volume or shape (or both volume and shape) of the occupant exceeds the threshold value, then method 600 moves to step 640; otherwise, method 600 moves to step 650. This determination may be based on at least one of the non-adult occupant's head height, eye location height, eye glass location height, facial feature height, shoulder height, leg surface height, or a biomechanical model (e.g., a stick figure model, for example, due to the bulky clothes of the non-adult occupant and/or the non-adult occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113*a*, 113*b* is prior to the occupant sitting in the child restraint seat 113*a*, 113*b* or after the occupant sits in the child restraint seat 113*a*, 113*b* from the visible portions of the child restraint seat 113*a*, 113*b*. This can be done by determining the distance of seating surface of the child restraint seat 113*a*, 113*b* from the seating surface(s) of the vehicle seat 108 that can be determined and stored prior to, during or after the child restraint seat 113*a*, 113*b* has been placed in the vehicle seat 108 by viewing the location of the vehicle seat 108 with a the one or more in-cabin sensors 105 or by getting inputs from seat position motors. Alternatively, if the one or more in-cabin sensors 105 cannot detect the seating surface location of the child restraint seat 113*a*, 113*b*, a nominal offset for a child restraint seat can be substituted. The child restraint seat 113*a*, 113*b* surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier step in this method, for example, step 610. Likewise, the locations of child restraint seat 113*a*, 113*b* seating surfaces can be determined at earlier step 610.

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 620, in those embodiments that implement a probability determination approach, if the occupant's size is deemed from a probability perspective to be nearer the larger occupant' size, the method moves to step 640, otherwise if the occupant's size is deemed from a probability perspective to be nearer the smaller occupant's size, the method moves to step 650.

In step 630, further implementing recognition module 104, controller 101 will determine whether the volume or shape (or both volume and shape) of an occupant found in the one or more images exceeds a threshold value. In essence, controller 101 will determine if the occupant that happens to be sitting directly on the vehicle seat 108 appears to be the size of a certain sized person, for instance, a child that is eight (8) years old (i.e., a threshold value that only takes the occupant into account). If the volume or shape (or both volume and shape) of the occupant exceeds the threshold value, then method 600 moves to step 640; otherwise, method 600 moves to step 650. As stated above, this determination may be based on at least one of the occupant's head height, eye location height, eye glass location height, facial feature height, shoulder height, leg surface height, or a biomechanical model (e.g., a stick figure model), for example, due to the bulky clothes of the non-adult occupant and/or the occupant's wearing of a hat. It should also be understood that the threshold value can be set for a volume and/or shape analogous to an adult up to a 5th percentile female and down to a child that is 3 years old. In addition, it is possible to assess against an occupant size greater than the size threshold and against an occupant size smaller than the size threshold and use the probability of the occupant being one of those sizes as the determining factor, where the measured occupant is determined to be on the side of the threshold where the higher probability is determined to be (as discussed above).

In step 640, seat occupation sensor 106 determines if a vehicle occupant of a non-adult size has entered onto and has begun to occupy its vehicle seat 108, or if present, its child restraint seat 113a, 113b. Moreover, seat occupation sensor 106 will send an output to controller 101. If a non-adult occupant is detected, method 600 will move to step 660; otherwise, method 600 will move to step 670. It should be understood that if an unknown state is detected by seat occupancy sensor 106, this detection may be treated as a non-adult for the purposes of this decision.

In step 650, seat occupation sensor 106 determines if a vehicle occupant of a non-adult size has entered onto and has begun to occupy its vehicle seat 108 or, if present, its child restraint seat 113a, 113b. Moreover, seat occupation sensor 106 will send an output to controller 101. If a non-adult occupant is detected, method 600 will move to step 680; otherwise, method 600 will move to step 670. It should be understood that if an unknown state is detected by seat occupancy sensor 106, this detection may be treated as a non-adult for the purposes of this decision.

In step 660, since the volume and/or shape of the occupant sitting in the child restraint seat 113a, 113b or sitting directly on the vehicle seat 108 exceeds the threshold (i.e., they are determined to be above a certain occupant size such as, for example, at least eight (8) years of age), controller 101 will enable deployment of an airbag module 107 and optionally pretensioner deployment 112. For example, controller 101 will allow airbag module 107 to inflate at a high deployment force or at least at a deployment force adequate for an occupant at least eight (8) years old (who is sitting in a child restraint seat 113 or sitting directly on the vehicle seat). After step 660, method 600 moves to completion 602.

In step 670, for an adult state, controller 101 will enable an unmitigated deployment of the airbag module 107 and may also deploy pretensioner 112. As follows, upon the occurrence of a substantial impact event, the airbag module 107 will inflate at a deployment force adequate for an adult. For an empty state, controller will suppress deployment of the airbag module 107 and may also suppress deployment of the pretensioner 112. For an unknown state, the logic in this step can consider this state as either the adult state or the empty state. After step 670, method 600 moves to completion 602.

In step 680, since the volume and/or shape of the occupant sitting in a child restraint seat 113 or sitting directly on vehicle seat 108 is smaller than the threshold (i.e., they are determined to be less than eight (8) years of age), controller 101 will suppress deployment of an airbag module 107 and may also suppress pretensioner 112. For example, controller 101 will suppress inflation of airbag module 107 to be at a low deployment force (i.e., one suitable for children under the age of eight (8) that are sitting in a child seat or sitting directly on a vehicle seat) or airbag module 107 will be suppressed to completely restrain airbag module 107 from any type of deployment. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 680, method 600 moves to completion 602.

Figure 7:
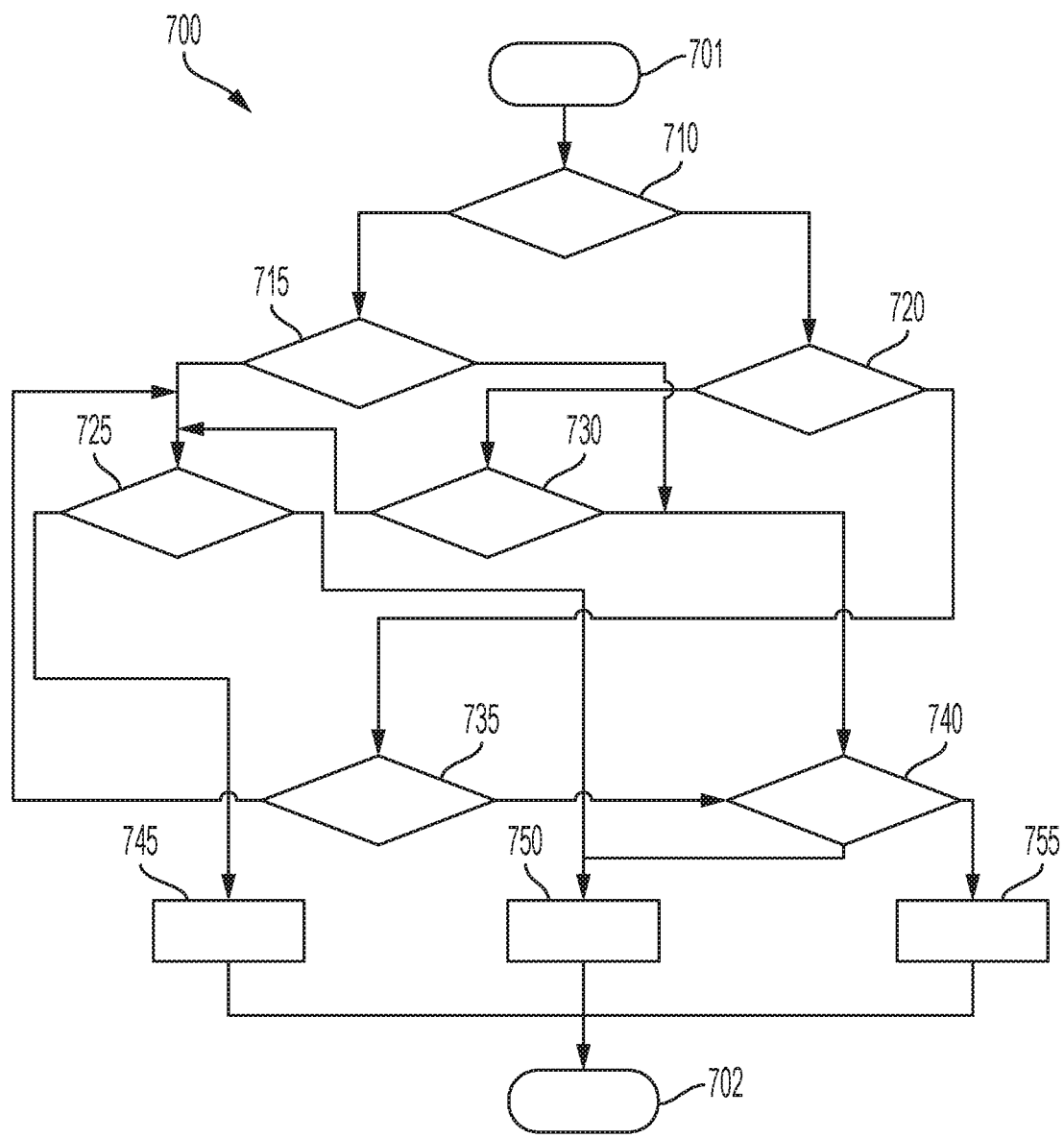
FIG. 7 shows a flow chart generally illustrating another exemplary method that may be performed to regulate airbag deployment.

FIG. 7 shows an exemplary method 700 to regulate airbag module 107 and, in certain instances, pretensioner 112 for the purposes of airbag and optionally pretensioner deployment enablement or suppression based on the characteristics of the occupation of vehicle seat 108, according to an exemplary aspect. Method 700 may begin at 701 in which vehicle 114 is in the OFF state and one or more vehicle doors are unlocked. Method 700 may also begin at 701 when a vehicle door is opened or when vehicle 114 is powered up. Method 700 may continue to be active when the vehicle is either powered or in-gear. Once Method 700 produces an occupant size determination, the method can optionally be hibernated and reawaken if the seat occupation sensor 106 detects a change in state or other vehicle sensors detect a change in occupancy. Moreover, the one or more in-cabin sensors 105 will produce one or more images of at least a portion of one or more vehicle seats 108 and such images will be sent to controller 101 (for at least temporary storage in memory 103).

In step 710, controller 101 will implement recognition module 104 to analyze the visual content of the one or more images for the purpose of identifying whether a child restraint seat 113a having a seatback (e.g., a child safety seat, convertible child safety seat, or car seat) had been mounted on the vehicle seat 108 (i.e., prior to the occupant entering onto the vehicle seat). Thus, if a child restraint seat 113a with seatback has been identified in the visual content, then method 700 will move to step 715; otherwise, method 700 will move to step 720.

In step 715, further implementing recognition module 104, controller 101 will determine whether the volume or shape (or both volume and shape) of an occupant in the child restraint seat exceeds the threshold value. In essence, controller 101 will determine if the occupant that happens to be sitting in the child restraint seat 113a equipped with a seatback appears to be the size of a certain sized person, for instance, a child that is at least eight (8) years old (i.e., a first threshold value that takes the child restraint seat 113a having a seatback into account). If the volume or shape (or both volume and shape) of the occupant exceeds the threshold value, then method 700 moves to step 725; otherwise, method 700 moves to step 740. This determination may be based on at least one of the occupant's head height, eye location height, eye glass location height, facial feature height, shoulder height, leg surface height, or a biomechanical model (e.g., a stick figure model), for example, due to the bulky clothes of the occupant and/or the occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113a is prior to the occupant sitting in the child restraint seat 113a or after the occupant sits in the child restraint seat 113*a* from the visible portions of the child restraint seat 113*a*. This can be done by determining the distance of seating surface of the child restraint seat 113*a* from the seating surface(s) of the vehicle seat 108 that can be determined and stored prior to, during or after the child restraint seat 113*a* has been placed in the vehicle seat 108 by viewing the location of the vehicle seat 108 with one or more in-cabin sensors 105 or by getting inputs from seat position motors. Alternatively, if the one or more in-cabin sensors 105 cannot detect the seating surface location of the child restraint seat 113*a* a nominal offset for a child restraint seat 113*a* can be substituted. The child restraint seat 113*a* surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier step in this method, for example, step 710. Likewise, the locations of child restraint seat 113*a* seating surfaces can be determined at step 710.

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 715, in those embodiments that implement a probability determination approach, if the occupant's size is deemed from a probability perspective to be nearer the larger occupant' size, the method moves to step 725, otherwise if the occupant's size is deemed from a probability perspective to be nearer the smaller occupant's size, the method moves to step 740.

In step 720, since a child restraint with a seat back 113*a* is not present, controller 101 will reevaluate the visual content of the one or more images (taken at the start of the method 701) to identify whether a child restraint seat 113*b* without a seatback (i.e., a booster seat) had been mounted on the vehicle seat 108 (i.e., the booster seat was present before the occupant entered onto the vehicle seat). If a child restraint seat 113*b* not comprising a seatback has been identified in the visual content, then method 700 will move to step 730; otherwise, method 700 will move to step 735. Skilled artists will see that steps 710 and 720 can be interchangeable.

In step 725, seat occupation sensor 106 verifies if a vehicle occupant of a non-adult size has begun to occupy the vehicle seat 108, or if present the child restraint seat 113*a*, 113*b*. Moreover, seat occupation sensor 106 will send an output to controller 101. If a non-adult occupant is detected, method 700 will move to step 745; otherwise, method 700 will move to step 750. It should be understood that when an unknown state is detected by seat occupancy sensor 106, this detection may be treated as a non-adult for the purposes of this decision.

In step 730, further implementing recognition module 104, controller 101 will determine whether the volume or shape (or both volume and shape) of an occupant found in visual content exceeds the threshold value. In essence, controller 101 will determine if the occupant that happens to be sitting in the child restraint seat 113*b* without a seatback (i.e., booster seat) appears to be the size of a certain sized person for instance a child that is at least eight (8) years old (i.e., a second threshold value that takes the child restraint seat 113*b* without a seatback into account). If the volume or shape (or both volume and shape) of the occupant exceeds the threshold value, then method 700 moves to step 725 (discussed above); otherwise, method 700 moves to step 740. This determination may be based on at least one of the occupant's head height, eye location height, eye glass location height, facial feature height, shoulder height, leg surface height, or a biomechanical model (e.g., a stick figure model), for example, due to the bulky clothes of the occupant and/or the occupant's wearing of a hat. It should also be understood that the threshold value can be set for a volume and/or shape analogous to an adult up to a 5th percentile female and down to a child that is 3 years old.

In addition, in this step, further implementing recognition module 104, controller 101 can determine what the volume or shape of the child restraint seat 113*b* is prior to the occupant sitting in the child restraint seat 113*b* or after the occupant sits in the child restraint seat 113*b* from the visible portions of the child restraint seat 113*b*. This can be done by determining the distance of seating surface of the child restraint seat 113*b* from the seating surface(s) of the vehicle seat 108 that can be determined and stored prior to, during or after the child restraint seat 113*b* has been placed in the vehicle seat 108 by viewing the location of the vehicle seat 108 with one or more in-cabin sensors 105 or by getting inputs from seat position motors. Alternatively, if the one or more in-cabin sensors 105 cannot detect the seating surface location of the child restraint seat 113*b*, a nominal offset for a child restraint seat can be substituted. The child restraint seat 113*b* surfaces can be used to adjust the threshold to reflect this offset distance when looking at the non-adult's position. For instance, the distance between the occupant's eyes and the vehicle seat surface can have the height of the child restraint seat surface relative to the vehicle seat surface subtracted to obtain the actual dimension for child. Measured locations for other non-adult landmarks can be handled in a similar manner. It should be understood that the location of the vehicle seat 108 seating surfaces can be determined at earlier step in this method, for example, step 710 or step 720. Likewise, the locations of child restraint seat 113*b* seating surfaces can be determined at earlier step 710 or step 720.

In one or more embodiments, in addition or alternatively, an approach can be used which compares measured occupant size to a smaller occupant size on one side of the threshold and to a larger occupant size the other size of the threshold, so as to subsequently determine which size the occupant is closest to based on a probability assessment. Such a determination is then used to make the decision on which side of the size threshold the measured occupant' size will be. For instance, in this example, an occupant size which is larger than the threshold of an 8 year old child can be selected for comparison to a 10 year old occupant, and an occupant size smaller than the threshold of an 8 year old child can be selected for comparison, for example, that of a 6 year old. The probability of an occupant being these occupant sizes can then be calculated from the size of the occupant in the camera image in addition to the size that has the highest probability based on the camera detection is then used to determine which side of the threshold the measured occupant's size will be. In step 730, in those embodiments that implement a probability determination approach, if the occupant's size is deemed from a probability perspective to be nearer the larger occupant' size, the method moves to step 725, otherwise if the occupant's size is deemed from a probability perspective to be nearer the smaller occupant's size, the method moves to step 740.

In step 735, no child restraint seat 113a, 113b (either with or without a seatback) has been identified in the visual content. Moreover, controller 101 will determine if the occupant that happens to be sitting directly on the vehicle seat 108 exceeds a threshold value. In essence, controller 101 will determine if the child sitting on vehicle seat 108 appears to be the size of a certain sized person for instance a child that is at least eight (8) years old (i.e., a third threshold value that only takes the occupant into account). If the volume or shape (or both volume and shape) of the occupant exceeds this third threshold value, then method 700 moves to step 725 (discussed above); otherwise, method 700 moves to step 740. This determination may be based on at least one of the occupant's head height, eye location height, eye glass location height, facial feature height, shoulder height, leg surface height, or a biomechanical model (e.g., a stick figure model), for example, due to the bulky clothes of the occupant and/or the occupant's wearing of a hat. It should also be understood that the threshold value can be set for a volume and/or shape analogous to an adult up to a 5th percentile female and down to a child that is 3 years old. In addition, it is possible to assess against an occupant size greater than the size threshold and against an occupant size smaller than the size threshold and use the probability of the occupant being one of those sizes as the determining factor, where the measured occupant is determined to be on the side of the threshold where the higher probability is determined to be (as discussed above).

In step 740, seat occupation sensor 106 verifies if a vehicle occupant of a non-adult size has entered into and has begun to occupy its vehicle seat 108, or if present its child restraint seat 113a, 113b. Moreover, seat occupation sensor 106 will send an output to controller 101. If a non-adult occupant is detected, method 700 will move to step 755; otherwise, method 700 will move to step 750. It should be understood that when an unknown state is detected by seat occupancy sensor 106, this detection may be treated as a non-adult for the purposes of this decision.

In step 745, since the volume and/or shape of the occupant sitting in the child restraint seat 113a, 113b or sitting directly on the vehicle seat 108 exceeds the threshold (i.e., they are determined to be above a certain occupant size such as, for example, at least eight (8) years of age), controller 101 will enable deployment of an airbag module 107 and may also enable pretensioner deployment 112. For example, controller 101 will allow airbag module 107 to inflate at a high deployment force or at least at a deployment force adequate for the occupant at least eight (8) years old (who is sitting in a child restraint seat 113a, 113b or sitting directly on the vehicle seat). After step 745, method 700 moves to completion 702.

In step 750, for an adult state, controller 101 will enable an unmitigated deployment of the airbag module 107 and optionally deployment of pretensioner 112. As follows, upon the occurrence of a substantial impact event, the airbag module 107 will inflate at a deployment force adequate for an adult. For an empty state, controller 101 will suppress deployment of the airbag module 107 and optionally suppress deployment of the pretensioner 112. For an unknown state, the logic in this step can consider this state as either the adult state or the empty state. After step 750, method 700 moves to completion 702.

In step 755, since the volume and/or shape of the occupant sitting in a child restraint seat 113 or sitting directly on vehicle seat 108 is smaller than the threshold (i.e., they are determined to be less than eight (8) years of age), controller 101 will suppress deployment of an airbag module 107 and optionally pretensioner 112. For example, controller 101 will suppress inflation of airbag module 107 to be at a low deployment force (i.e., one suitable for children under the age of eight (8) that are sitting in a child seat or sitting directly on a vehicle seat) or airbag module 107 will be suppressed to completely restrain airbag module 107 from any type of deployment. The suppressed deployment state of the airbag module 107 may also be presented to one or more vehicle passengers via a notification, which may be provided audibly via audio system 110 (e.g., a chime warning) and/or visually via display 109 (e.g., a text message exhibited on a graphical user interface). This notification will warn the one or more passengers (e.g., the vehicle operator) of the suppressed state and can let them know if there has been a mistake with the vehicle's analysis. After step 755, method 700 moves to completion 702.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A method of restraint deployment regulation, the method comprising:
   (a) determining whether a non-adult occupant is occupying a vehicle seat;
   (b) determining whether a child restraint seat is mounted on the vehicle seat;
   (c) based on steps (a) and (b), enabling or suppressing a deployment of a restraint that corresponds with the vehicle seat;
   (d) determining whether a volume or shape of the non-adult occupant exceeds a threshold value; and
   step (c) is further based on step (d).

2. The method of claim 1, wherein step (d) is performed when the non-adult occupant is determined to be sitting in the vehicle seat.

3. The method of claim 1, wherein step (d) is performed when the non-adult occupant is determined to be sitting on a child restraint seat mounted on the vehicle seat.

4. The method of claim 1, wherein:
   when the child restraint seat is determined to be mounted on the vehicle seat, (d) determining whether the child restraint seat comprises a seatback; and
   when the child restraint seat is determined to comprise the seatback and the non-adult occupant is determined to be occupying the vehicle seat, (e) determining whether the volume or shape of the non-adult occupant exceeds a first threshold value, and wherein step (c) is further based on step (e); or
   when the child restraint seat is determined not to comprise the seatback and the non-adult occupant is determined to be occupying the vehicle seat, (f) determining whether the volume or the shape of the non-adult occupant exceeds a second threshold value, and wherein step (c) is further based on step (f).

5. The method of claim 1, wherein step (a) precedes step (b).

6. The method of claim 1, wherein the restraint is at least one of an airbag module or pretensioner.

7. The method of claim 1, wherein:
   when the non-adult occupant is determined to be occupying the vehicle seat, (d) determining whether the volume or shape of the non-adult occupant exceeds the threshold value by at least one of:
   comparing the volume or shape of the non-adult occupant to the threshold value; or
   utilizing a probability determination, wherein the probability of the volume or shape is compared to a predetermined occupant size above the threshold value and a predetermined occupant size below the threshold value.

8. A system of restraint deployment regulation, the system comprises:
   a memory configured to comprise a plurality of executable instructions and a processor configured to execute the executable instructions, wherein the executable instructions enable the processor to:
   (a) determine, based on an output of a seat occupation sensor, whether a non-adult occupant is occupying a vehicle seat;
   (b) determine, based on an in-cabin sensor output, whether a child restraint seat is mounted on the vehicle seat;
   (c) based on steps (a) and (b), enable or suppress a deployment of an airbag module that corresponds with the vehicle seat;
   d) determine, based on the in-cabin sensor output, whether a volume or shape of the non-adult occupant exceeds a threshold value; and
   step (c) is further based on step (d).

9. The system of claim 8, wherein the executable instructions further enable the processor to perform step (d) when the non-adult occupant is determined to be sitting in the vehicle seat.

10. The system of claim 8, wherein the executable instructions further enable the processor to:
    when the child restraint seat is determined to be mounted on the vehicle seat, (d) determine, based on the in-cabin sensor output, whether the child restraint seat comprises a seatback; and
    when the child restraint seat is determined to comprise the seatback and the non-adult occupant is determined to be occupying the vehicle seat, (e) determine, based on the in-cabin sensor output, whether the volume or shape of the non-adult occupant exceeds a first threshold value, and wherein step (c) is further based on step (e); or
    when the child restraint seat is determined not to comprise the seatback and the non-adult occupant is determined to be occupying the vehicle seat, (f) determine, based on the in-cabin sensor output, whether the volume or the shape of the non-adult occupant exceeds a second threshold value, and wherein step (c) is further based on step (f).

11. The system of claim 8, wherein step (a) precedes step (b).

12. The system of claim 8, wherein occupant size is determined by subtracting a thickness of the child restraint seat from a distance from an occupant landmark to a vehicle seating surface.

13. The system of claim 8, wherein the seat occupation sensor is installed at the vehicle seat and is configured to detect the occupation of the non-adult occupant in the vehicle seat after the non-adult occupant has placed at least a portion of their body weight on the vehicle seat.

14. The system of claim 8, wherein the seat occupation sensor is a pressure sensor, capacitive sensor, resistive sensor, weight sensor, or biometric sensor.

15. A non-transitory and machine-readable medium having stored thereon executable instructions adapted to regulate restraint deployment, which when provided to a processor and executed thereby, causes the processor to carry out:
    (a) determine, based on an output of a seat occupation sensor, whether a non-adult occupant is occupying a vehicle seat;
    (b) determine, based an output of an in-cabin sensor, whether a child restraint seat is mounted on the vehicle seat;
    (c) based on steps (a) and (b), enable or suppress a deployment of an airbag module that corresponds with the vehicle seat;
    (d) determine, based on the in-cabin sensor output, whether a volume or shape of the non-adult occupant exceeds a threshold value; and
    step (c) is further based on step (d).

16. The non-transitory and machine-readable medium of claim 15, wherein the processor further carries out performing step (d) when the non-adult occupant is determined to be sitting in the vehicle seat.

17. The non-transitory and machine-readable medium of claim 15, wherein:
- when the child restraint seat is determined to be mounted on the vehicle seat, (d) determine, based on the in-cabin sensor output, whether the child restraint seat comprises a seatback; and
- when the child restraint seat is determined to comprise the seatback and the non-adult occupant is determined to be occupying the vehicle seat, (e) determine, based on the in-cabin sensor output, whether the volume or shape of the non-adult occupant exceeds a first threshold value, and wherein step (c) is further based on step (e); or
- when the child restraint seat is determined not to comprise the seatback and the non-adult occupant is determined to be occupying the vehicle seat, (f) determine, based on the in-cabin sensor output, whether the volume or the shape of the non-adult occupant exceeds a second threshold value, and wherein step (c) is further based on step (f).

18. The non-transitory and machine-readable medium of claim 15, wherein step (a) precedes step (b).

19. The non-transitory and machine-readable medium of claim 15, wherein the in-cabin sensor is a camera, ultrasonic sensor, RADAR sensor, LIDAR sensor, or infrared sensor.

20. The non-transitory and machine-readable medium of claim 15, wherein the seat occupation sensor is installed at the vehicle seat and is configured to detect the occupation of the non-adult occupant in the vehicle seat after the non-adult occupant has placed at least a portion of their body weight on the vehicle seat.

* * * * *